United States Patent
Lv et al.

(10) Patent No.: US 9,658,879 B2
(45) Date of Patent: May 23, 2017

(54) SYSTEM AND METHOD FOR SUPPORTING BUFFER ALLOCATION IN A SHARED MEMORY QUEUE

(71) Applicant: Oracle International Corporation, Redwood Shores, CA (US)

(72) Inventors: Xianzheng Lv, Beijing (CN); Xiangdong Li, Beijing (CN); Pei Zhi Shi, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 420 days.

(21) Appl. No.: 13/804,414

(22) Filed: Mar. 14, 2013

(65) Prior Publication Data

US 2013/0246714 A1    Sep. 19, 2013

Related U.S. Application Data

(60) Provisional application No. 61/612,144, filed on Mar. 16, 2012.

(51) Int. Cl.
*G06F 3/06* (2006.01)
*G06F 9/46* (2006.01)
(Continued)

(52) U.S. Cl.
CPC ............ *G06F 9/466* (2013.01); *G06F 3/0659* (2013.01); *G06F 9/544* (2013.01); *G06F 9/546* (2013.01);
(Continued)

(58) Field of Classification Search
CPC .................... G06F 9/544; G06F 9/546
See application file for complete search history.

(56) References Cited

U.S. PATENT DOCUMENTS 5,247,023 A    9/1993   Chung
5,261,089 A    11/1993  Coleman et al.
(Continued)

FOREIGN PATENT DOCUMENTS

| CN | 101438248 A | 5/2009 |
| CN | 102203779 A | 9/2011 |
| CN | 102317913 A | 1/2012 |

OTHER PUBLICATIONS

State Intellectual Property Office of the People's Republic of China, Office Action Dated Dec. 23, 2016 for Chinese Patent Application No. 201380008047.6, 10 Pages.
(Continued)

*Primary Examiner* — Charles Rones
*Assistant Examiner* — Tian-Pong Chang
(74) *Attorney, Agent, or Firm* — Tucker Ellis LLP

(57) ABSTRACT

A system and method can support buffer allocation in a shared memory queue. The shared memory queue can be associated with a shared memory, to which one or more communication peers are attached. One or more processes can travel through a plurality of memory blocks in the shared memory, and can allocate one or more message buffers in the shared memory mutual exclusively. The allocated message buffers can be used to contain one or more messages for the one or more communication peers. Furthermore, a said process can allocate the message buffers based on an atomic operation on the memory block at the instruction level.

12 Claims, 11 Drawing Sheets

(51) Int. Cl.
*G06F 17/30* (2006.01)
*G06F 9/54* (2006.01)
*G06F 15/167* (2006.01)
*H04L 29/08* (2006.01)

(52) U.S. Cl.
CPC ...... *G06F 15/167* (2013.01); *G06F 17/30289* (2013.01); *H04L 67/02* (2013.01); *H04L 67/10* (2013.01)

(56) References Cited

U.S. PATENT DOCUMENTS

| | | | |
|---|---|---|---|
| 5,452,445 A | 9/1995 | Hallmark et al. | |
| 5,555,396 A | 9/1996 | Alferness et al. | |
| 5,617,537 A | 4/1997 | Yamada et al. | |
| 5,652,885 A * | 7/1997 | Reed | G06F 9/544 713/1 |
| 5,680,610 A | 10/1997 | Smith | |
| 6,070,202 A | 5/2000 | Minkoff et al. | |
| 6,154,847 A | 11/2000 | Schofield et al. | |
| 6,374,243 B1 | 4/2002 | Kobayashi | |
| 6,470,342 B1 | 10/2002 | Gondi et al. | |
| 6,629,153 B1 | 9/2003 | Gupta | |
| 6,754,842 B2 | 6/2004 | Kettley et al. | |
| 7,103,597 B2 | 9/2006 | McGoveran | |
| 7,284,018 B1 | 10/2007 | Waldorf | |
| 7,380,155 B2 | 5/2008 | Fung et al. | |
| 7,430,740 B1 | 9/2008 | Molloy et al. | |
| 7,694,178 B2 | 4/2010 | Hobson | |
| 7,725,446 B2 | 5/2010 | Huras | |
| 7,743,036 B2 | 6/2010 | Cotner et al. | |
| 7,822,727 B1 | 10/2010 | Shaughnessy | |
| 7,913,261 B2 * | 3/2011 | Mitchell | H04L 9/3271 713/189 |
| 7,970,737 B2 | 6/2011 | Parkinson | |
| 8,671,085 B2 | 3/2014 | Dhamankar et al. | |
| 8,738,964 B2 | 5/2014 | Markus | |
| 8,868,506 B1 | 10/2014 | Bhargava et al. | |
| 9,146,944 B2 | 9/2015 | Parkinson | |
| 2001/0047436 A1 | 11/2001 | Sexton et al. | |
| 2002/0023129 A1 | 2/2002 | Hsiao et al. | |
| 2002/0116568 A1 | 8/2002 | Oksanen | |
| 2002/0144006 A1 * | 10/2002 | Cranston | G06F 9/544 719/312 |
| 2003/0005172 A1 | 1/2003 | Chessell | |
| 2003/0035372 A1 | 2/2003 | Schaub | |
| 2003/0154423 A1 | 8/2003 | Egolf | |
| 2004/0015079 A1 * | 1/2004 | Berger | A61B 8/461 600/437 |
| 2004/0123293 A1 | 6/2004 | Johnson | |
| 2004/0153349 A1 | 8/2004 | K et al. | |
| 2004/0153450 A1 | 8/2004 | K et al. | |
| 2004/0158549 A1 | 8/2004 | Matena et al. | |
| 2005/0044551 A1 | 2/2005 | Sodhi | |
| 2005/0144171 A1 | 6/2005 | Robinson | |
| 2005/0144299 A1 | 6/2005 | Blevins | |
| 2005/0182795 A1 | 8/2005 | Murthy | |
| 2005/0262055 A1 | 11/2005 | Newport | |
| 2005/0262077 A1 | 11/2005 | Barnes | |
| 2006/0010026 A1 | 1/2006 | Nenov | |
| 2006/0075277 A1 | 4/2006 | Johnson et al. | |
| 2006/0080668 A1 | 4/2006 | Blackmore et al. | |
| 2006/0136887 A1 | 6/2006 | Kaczynski et al. | |
| 2006/0149791 A1 | 7/2006 | Sinha et al. | |
| 2006/0179125 A1 | 8/2006 | Pavlik et al. | |
| 2006/0235853 A1 | 10/2006 | Luo | |
| 2007/0041392 A1 * | 2/2007 | Kunze et al. | 370/412 |
| 2007/0079077 A1 | 4/2007 | Baines et al. | |
| 2007/0156729 A1 | 7/2007 | Shaylor | |
| 2007/0165625 A1 | 7/2007 | Eisner | |
| 2008/0127219 A1 | 5/2008 | Lacombe et al. | |
| 2008/0147945 A1 | 6/2008 | Zimmer | |
| 2008/0177955 A1 * | 7/2008 | Su | 711/154 |
| 2008/0243865 A1 | 10/2008 | Hu et al. | |
| 2008/0250074 A1 | 10/2008 | Parkinson | |
| 2009/0070330 A1 | 3/2009 | Hwang et al. | |
| 2009/0158397 A1 * | 6/2009 | Herzog et al. | 726/4 |
| 2009/0172153 A1 | 7/2009 | Cohen | |
| 2009/0248765 A1 | 10/2009 | Akidau et al. | |
| 2009/0292744 A1 | 11/2009 | Matsumura | |
| 2010/0042999 A1 | 2/2010 | Dorai et al. | |
| 2010/0169284 A1 | 7/2010 | Walter et al. | |
| 2010/0198920 A1 * | 8/2010 | Wong et al. | 709/206 |
| 2011/0055313 A1 | 3/2011 | Little | |
| 2011/0087633 A1 | 4/2011 | Kreuder et al. | |
| 2011/0145204 A1 | 6/2011 | Maple et al. | |
| 2012/0084274 A1 | 4/2012 | Renkes et al. | |
| 2012/0131285 A1 * | 5/2012 | Leshchiner et al. | 711/147 |
| 2012/0166889 A1 | 6/2012 | El-Kersh et al. | |
| 2012/0210094 A1 | 8/2012 | Blocksome et al. | |
| 2013/0066949 A1 | 3/2013 | Colrain | |

OTHER PUBLICATIONS

State Intellectual Property Office of the People's Republic of China, Office Action Dated Dec. 26, 2016 for Chinese Patent Application No. 201380008052.7, 12 Pages.

IBM, IBM® DB2 Universal Database™ Administration Guide: Performance Version 8, © Copyright International Business Machines Corporation 1993-2002, Entire Book.

Hirotaka Taruzawa, Takakiyo Tanaka, Aim! J2EE Architect Mission Critical Systems Development Course, Monthly Java World, Japan, Tokyo: IDG Japan, Apr. 1, 2005, vol. 9 No. 4 (Serial No. 95), pp. 130-141.

Yoshihiro Iwamiya, Shigeru Urushibara, 3. Art to Support Distributed Transaction Processing, Basic Knowledge 4 for SE, Distributed-Transaction Processing 1st Edition, Tokyo : Co. Ltd. Ric Telecom, Apr. 20, 1994, 1st Edition, pp. 84-91, 228, 262-263, ISBN4-89797-056-3.

* cited by examiner

SYSTEM AND METHOD FOR SUPPORTING BUFFER ALLOCATION IN A SHARED MEMORY QUEUE

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, which application is herein incorporated by reference.

CROSS REFERENCE TO RELATED APPLICATIONS

This application is related to the following patent applications, each of which is hereby incorporated by reference in its entirety:

U.S. patent application Ser. No. entitled "SYSTEM AND METHOD FOR TRANSMITTING COMPLEX STRUCTURES BASED ON A SHARED MEMORY QUEUE", application Ser. No. 13/804,608, filed Mar. 14, 2013; and U.S. patent application Ser. No. entitled "SYSTEM AND METHOD FOR SUPPORTING INTRA-NODE COMMUNICATION BASED ON A SHARED MEMORY QUEUE", application Ser. No. 13/804,687, filed Mar. 14, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting buffer allocation in a shared memory queue. The shared memory queue can be associated with a shared memory, to which one or more communication peers are attached. One or more processes can travel through a plurality of memory blocks in the shared memory, and can allocate one or more message buffers in the shared memory mutual exclusively. The allocated message buffers can be used to contain one or more messages for the one or more communication peers. Furthermore, a said process can allocate the message buffers based on an atomic operation on the memory block at the instruction level.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some"

embodiment(s) in this disclosure are not necessarily to the same embodiment, and such references mean at least one.

The description of the invention as following uses the Tuxedo® environment as an example for a transactional middleware machine environment. It will be apparent to those skilled in the art that other types of transactional middleware machine environments can be used without limitation.

Described herein are systems and methods that can support buffer allocation in shared memory for a shared memory queue.

Inter-Process Communication Message Queue (IPCQ)

Figure 1:
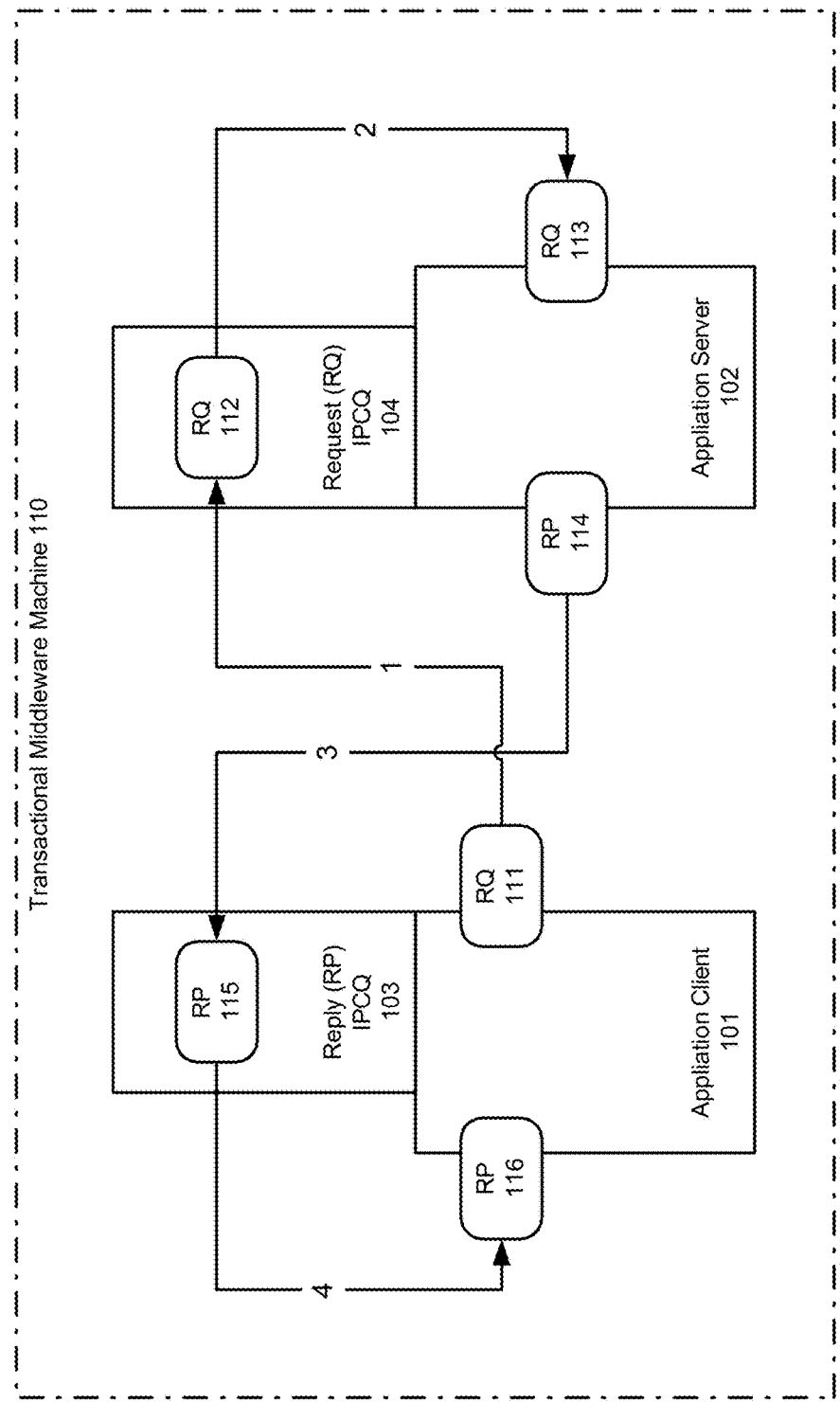
FIG. 1 shows an illustration of intra-node communication based on one or more inter-process communication message queues (IPCQs) in a transactional middleware machine environment.

FIG. 1 shows an illustration of intra-node communication based on one or more inter-process communication message queues (IPCQs) in a transactional middleware machine environment. As shown in FIG. 1, a transactional middleware machine 110 in a transactional middleware machine environment 100, e.g. the Tuxedo environment, can include an application client 101 and an application server 102, each of which can use an inter-process communication message queue (IPCQ) for supporting inter-process communication.

For example, the application client 101 can be associated with a reply (RP) IPCQ 103, while the application server 102 can be associated with a request (RQ) IPCQ 104. In Tuxedo, the inter-process communication message queue (IPCQ) can be either a System V IPC message queue or a remote direct memory access (RDMA) message queue (MSGQ).

Furthermore, in order to transmit a single message, the inter-process communication message queue (IPCQ) may need to use at least two copies of the single message, such as:

a first copy of the message from a sender, e.g. the application client 101, to an IPCQ 104 associated with the sender, and a second copy from the IPCQ 104 to the receiver, e.g. the application server 102.

Similarly, a message round trip between the application client 101 and the application server 102 may involve at least four copies of the message:

A first copy used by the application client 101 to send a request (RQ) message 111 to a request (RQ) IPC queue 104 associated with a application server 102 (as request (RQ) message 112), A second copy used by the application server 102 to receive the request (RQ) message 113 from its request (RQ) IPC queue 112, A third copy used by the application server 102 to send a reply (RP) message 114 to a reply (RP) IPC queue 103 associated with the application client 101 (as reply (RP) message 115), and A fourth copy used by the application client 101 to receive the reply (RP) message 116 from its reply (RP) IPC queue 103.

Thus, the performance of intra-node messaging of the system may be restricted, both in terms of resource usage and in terms of message processing time, due to the need for handling multiple copies of the same message, especially when the message involves large message buffers.

Shared Memory Queue (SHMQ)

In accordance with an embodiment of the invention, a shared memory queue (SHMQ) can be used for local messaging in a transactional middleware machine environment, e.g. enhancing native tpcall performance in Tuxedo.

Figure 2:
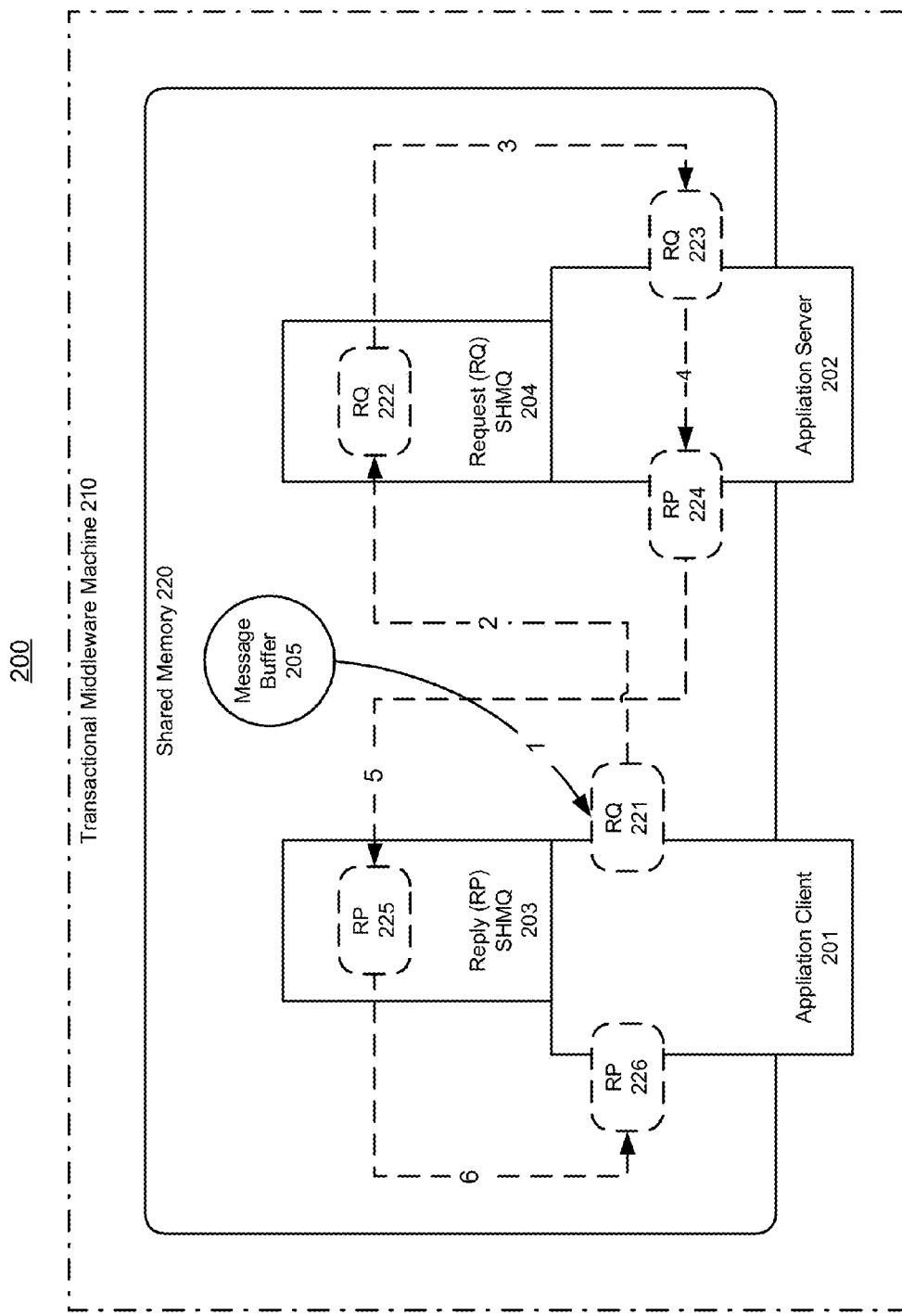
FIG. 2 shows an illustration of intra-node communication based on one or more shared memory queues (SHMQs) in a transactional middleware machine environment, in accordance with an embodiment of the invention.

FIG. 2 shows an illustration of intra-node communication based on one or more shared memory queues (SHMQs) in a transactional middleware machine environment, in accordance with an embodiment of the invention. As shown in FIG. 2, the intra-node messaging within a single transactional middleware machine 210 in a transactional middleware machine environment 200, e.g. the Tuxedo environment, can be based on a shared memory 220, e.g. the local bulletin board (BB) in Tuxedo.

The transactional middleware machine 210 can include communication peers, such as an application client 201 and an application server 202, each of which can use a shared memory queue (SHMQ). For example, the application client 201 can be associated with a reply (RP) SHMQ 203, and the application server 202 can be associated with a request (RQ) SHMQ 204. Both the reply (RP) SHMQ 203 and the request (RQ) SHMQ 204 can reside in the shared memory 220, which is attached with the communicating peers 201 and 202.

A message can be allocated in the shared memory 220 using a message buffer 205. Furthermore, the sending of the message can be implemented by linking the message buffer 205 to a shared memory queue (SHMQ), e.g. the request (RQ) SHMQ 204, and the receiving of the message can be implemented by delinking message buffer 205 from the shared memory queue (SHMQ), e.g. the request (RQ) SHMQ 204. Thus, the transmission of the message between the communicating peers 201-202 can require no physical copy.

After receiving the message in the message buffer 205, the server can modify it, and can send it to the client 201 in by linking the message buffer 205 to the reply (RP) SHMQ 203. Again, the receiving of the message can be implemented by delinking the message buffer 205 from the RP SHMQ 203. Thus, the transmission requires no physical copy of the message.

As shown in FIG. 2, the system can support a message round trip using a RP SHMQ 203 and a RQ SHMQ 204.

At step 1, the application client 201 can allocate a message buffer 205 in the shared memory 220 for a request (RQ) message 221.

At step 2, the application client 201 can link the message buffer 205 to a request SHMQ 204 attached to the application server 202 (as a request (RQ) message 222), and optionally notify the server 202 of the incoming new message.

At step 3, the application server 202 can delink the message buffer 205 from its request SHMQ 204 and receives the request (RQ) message 223 which points to the message buffer 205.

At step 4, the application server 202 can modify or reuse the message buffer 205 for sending a reply (RP) message 224.

At step 5, the application server 202 can link the message buffer 205 to a reply (RP) SHMQ 203 attached to the application client 201 (as a reply (RP) message 225), and optionally notify the client 201 of the incoming new message.

Finally, at step 6, the application client 201 can receive the reply (RP) message 226 by delinking the message buffer 205 from its reply SHMQ 203.

Thus, using the shared memory queue (SHMQ), a message round trip between the communicating peers, e.g. the application client 201 and the application server 202, can involve zero copy of the message.

In accordance with an embodiment of the invention, each SHMQ can be bounded with an inter-process communication message queue (IPCQ). The IPCQ can accept both the shared memory messages (SHMMSGs) and local memory messages, while SHMQ may only accept the shared memory messages (SHMMSGs).

Using the shared memory queue (SHMQ) feature, all message buffers can be centralized in the shared memory 220 instead of in the local memory of each process. In order to ensure the stability and high performance of the system, the shared memory queue (SHMQ) may need to recycle message buffers from the dead (or terminated) applications, and to fail over to local memory buffers when SHMMSG buffers are exhausted.

Furthermore, the IPCQ can work as a notification channel for the SHMQ. For example, a sender can use the IPCQ to send a short message between the communication peers for coordinating the transmission of the shared memory messages (SHMMSGs). Additionally, the IPCQ can also act as a backup queue when SHMQ fails. Also, by bounding an IPCQ to a SHMQ, other features such as message queue (MSGQ), multi-thread server and restartable server, which may be available for the IPCQ, can be easily applied to the SHMQ.

In the example of Tuxedo, each Tuxedo server can have a request (RQ) SHMQ, and each Tuxedo client can have at least a reply (RP) SHMQ. These shared memory queues (SHMQs) can be assigned to the Tuxedo application after the bulletin board (BB) is attached.

Figure 3:
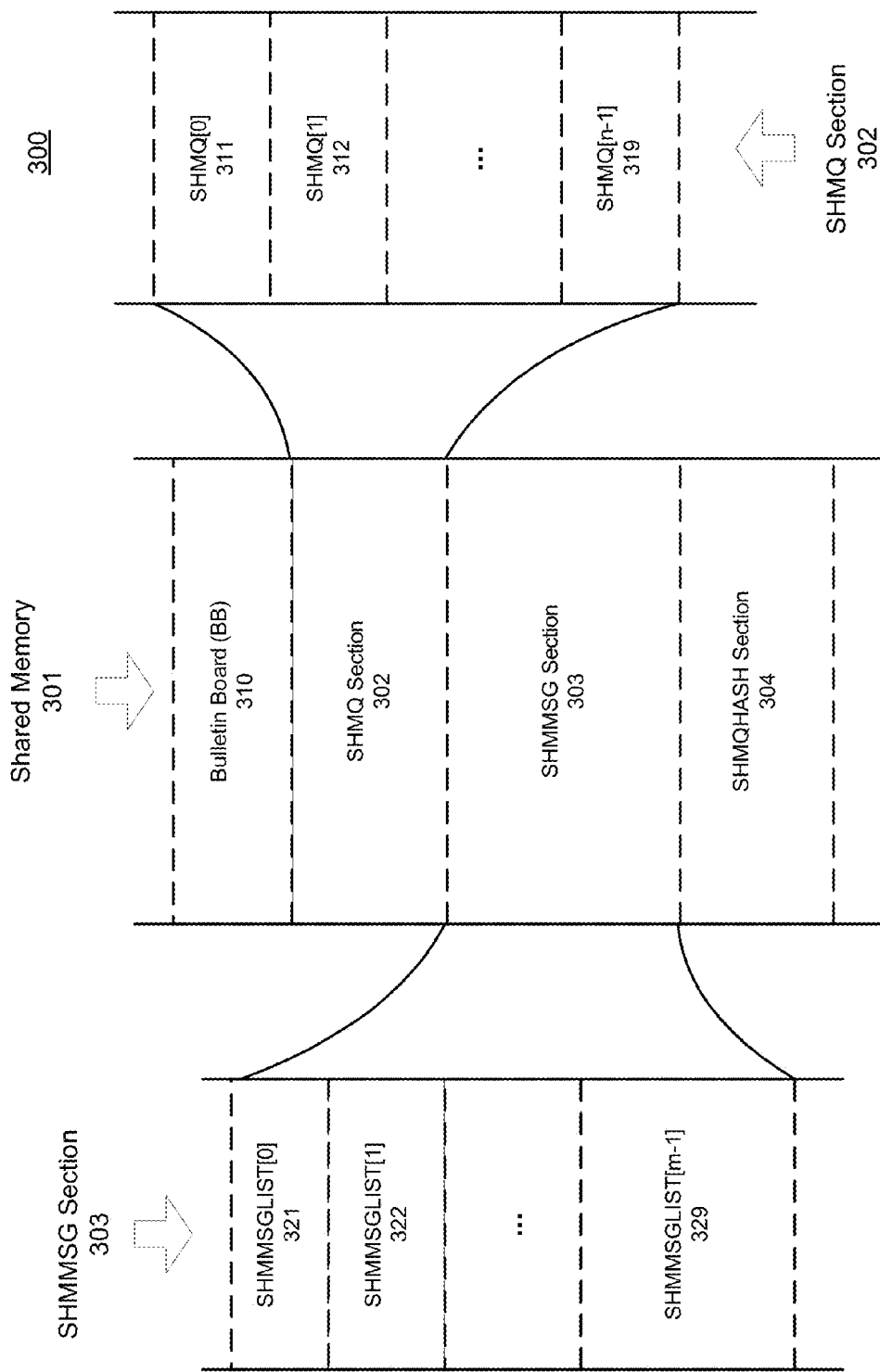
FIG. 3 shows an illustration of a shared memory layout for a shared memory queue (SHMQ) in a transactional middleware machine environment, in accordance with an embodiment of the invention.

FIG. 3 shows an illustration of a shared memory layout for a shared memory queue (SHMQ) in a transactional middleware machine environment, in accordance with an embodiment of the invention. As shown in FIG. 3, the shared memory 301 in a transactional middleware machine environment 300 includes one or more sections that can be stored continuously, e.g. a SHMQ section 302, a SHMMSG section 303 and a SHMQHASH section 304. In the example of Tuxedo, these sections 302-304 can be attached to an existing local bulletin board (BB) 310.

The SHMQ section 302 can store an array of shared memory queue (SHMQ) head structures, e.g. SHMQ[0] 311 to SHMQ[n-1] 319. The total element number, n, representing the number of queues for which memory space need to be allocated, is the sum of (MAXQUEUES+MAXACCESSERS+MAXADMIN). MAXQUEUES is the maximum number of queues that server processes require. MAXACCESSERS is the maximum number of queues that client processes require. MAXADMIN is the maximum number of queues that system processes require. The element number n also represents the total number of queues, including request and reply queues.

The SHMMSG section 303 includes one or more message lists, e.g. SHMMSGLIST[0] 321 to SHMMSGLIST[m-1] 329, each of which can store one or more messages of a particular size. Here, the number of message lists, m, can be a constant in Tuxedo. Furthermore, the message lists 321-329 can be stored in the SHMMSG section 303 of the shared memory 301 in an ascending order based on the message size.

Additionally, the SHMQHASH section 304 contains an array of indices that can be used for quickly finding a shared memory queue (SHMQ) in the shared memory 301. Each index can be used as a key in a hash table for finding the address of a queue head structure for a shared memory queue (SHMQ) in the shared memory 301.

Figure 4:
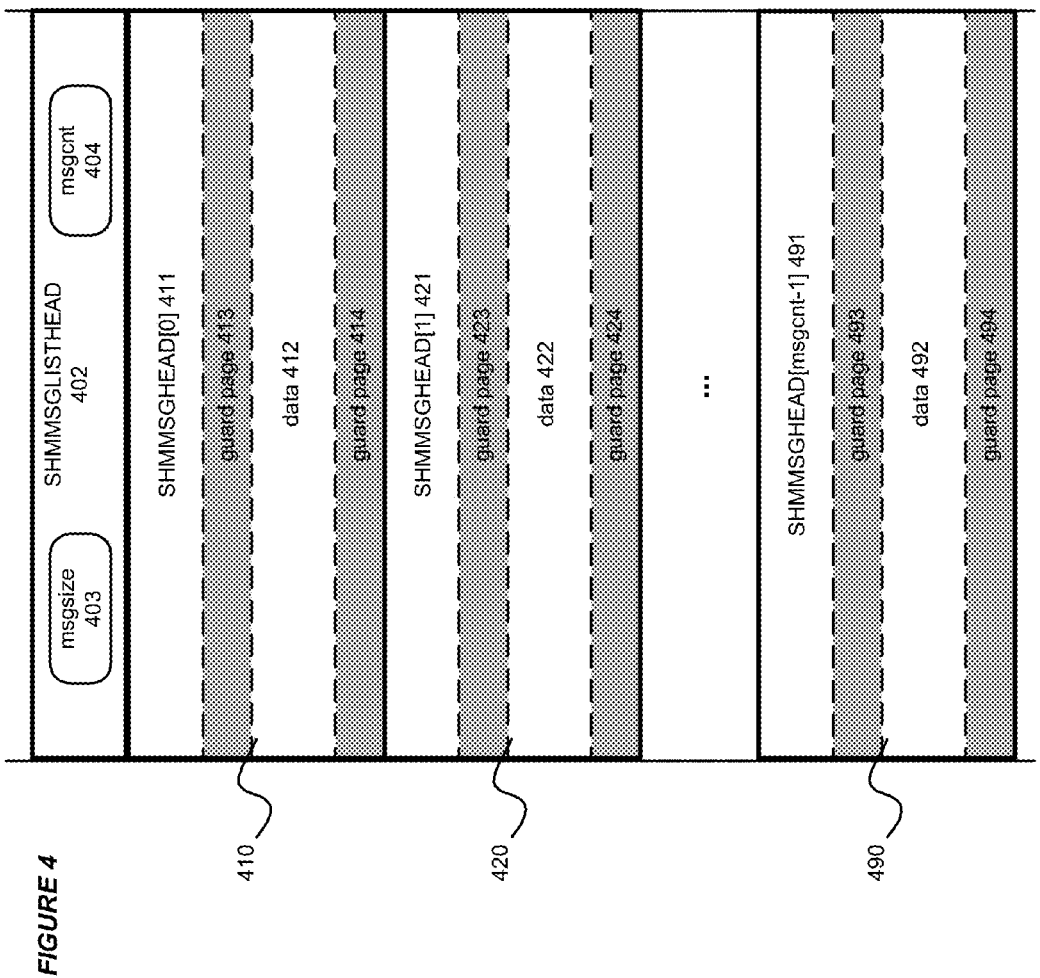
FIG. 4 shows an illustration of one or more shared memory messages in a shared memory for a shared memory queue (SHMQ) in a transactional middleware machine environment, in accordance with an embodiment of the invention.

FIG. 4 shows an illustration of one or more shared memory messages in a shared memory for shared memory queue (SHMQ) in a transactional middleware machine environment, in accordance with an embodiment of the invention. As shown in FIG. 4, a message list, e.g. SHMMSGLIST 401, can include a unified message list header, e.g. SHMMSGLIST-HEAD 402, and an array of messages with the same body size, e.g. SHMMSG[0] 410 to SHMMSG[msgcnt-1] 490.

The SHMMSGLISTHEAD 402 can contain several attributes, e.g. msgsize 403 and msgcnt 404. These attributes can be configured in a configuration file, e.g. UBBCONFIG, with msgcnt 404 defining the number of individual messages, and msgsize 403 defining the size of messages stored in the message list 401.

Additionally, each message within the message list, e.g. SHMMSGLIST 401, can include a unified message header and a message body with a fixed size. Furthermore, there can be guard pages wrapping each message body in order to prevent accidental write accesses from corrupting the entire shared memory. For example, SHMMSG 410 includes SHMMSGHEAD[0] 411 and data 412 protected by guard pages 413-414; SHMMSG 420 includes SHMMSGHEAD[1] 421 and data 422 protected by guard pages 423-424; and SHMMSG 490 includes SHMMSGHEAD[msgcnt-1] 491 and data 492 protected by guard pages 493-494.

Figure 5:
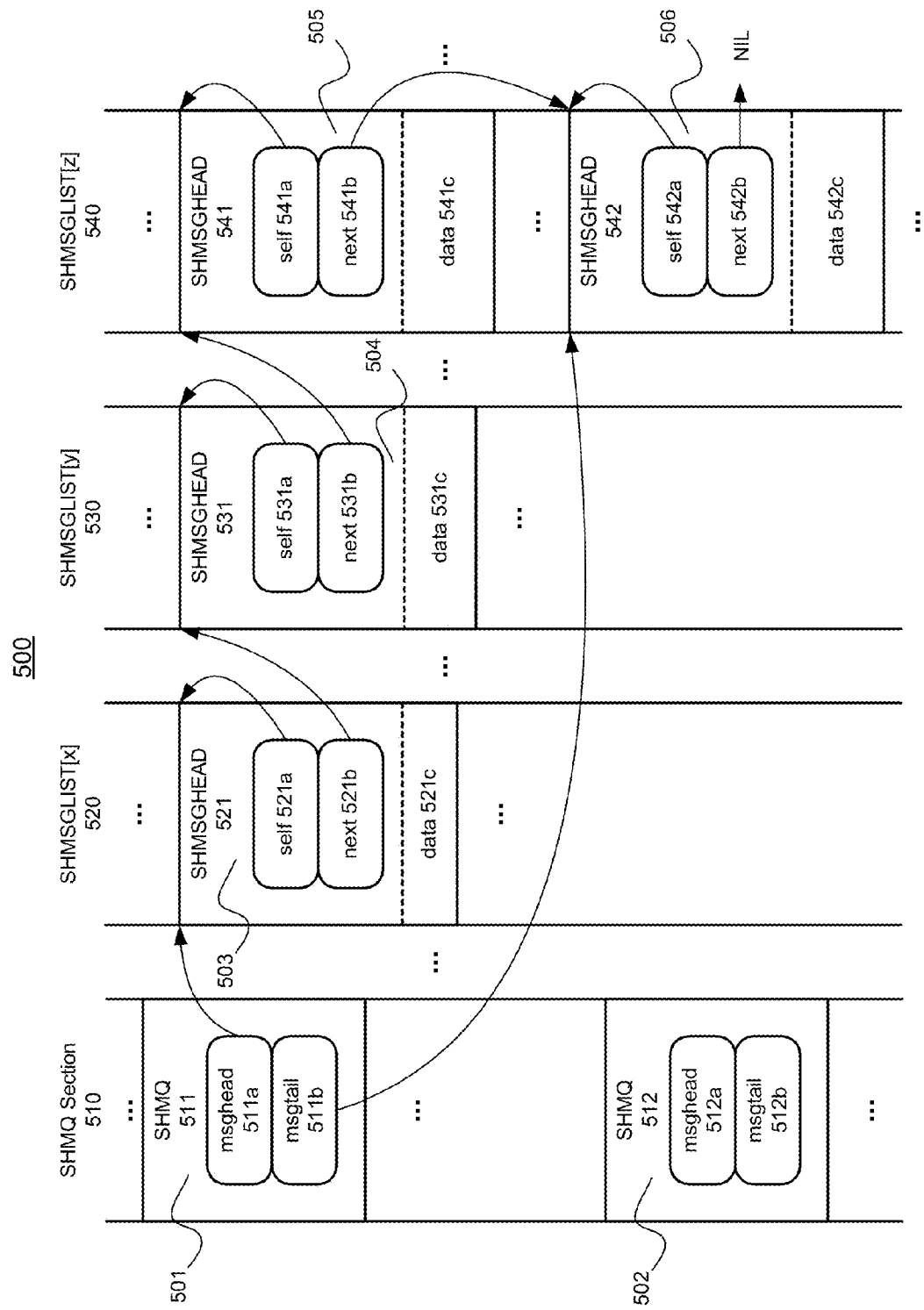
FIG. 5 shows an illustration of the addressing scheme in a shared memory for a shared memory messages (SHMMSG) in a transactional middleware machine environment, in accordance with an embodiment of the invention.

FIG. 5 shows an illustration of the addressing scheme in a shared memory for shared memory messages (SHMMSG) in a transactional middleware machine environment, in accordance with an embodiment of the invention. As shown in FIG. 5, one or more shared memory queues (SHMQs) 501-502, can be provided in a share memory 500. The shared memory 500 can be organized in a shared memory queue head section, e.g. a SHMQ section 510, and one or more message list sections, e.g. SHMSGLIST sections 520-540, with each message list containing an array of messages.

Each shared memory queue (SHMQ) 501-502 can include a queue head structure in the SHMQ section 510 and a linked-list of shared memory messages spanning over the one or more SHMSGLIST sections 520-540.

For example, the shared memory queue (SHMQ) 501 can include a queue head structure, SHMQ 511, and a linked-list of shared memory messages, e.g. SHMMSGs 503-506. The SHMQ 511 can be a control block that holds at least two links: a head link, msghead 511a, and a tail link, msgtail 511b. The head link, msghead 511a, can point to a message head for the first message, e.g. SHMSGHEAD 521 for the message 503, and the tail link, msgtail 511b, can point to a message head for the last message, e.g. SHMSGHEAD 542 for the message 506.

Additionally, the shared memory queue (SHMQ), e.g. 501 or 502, can include a linked-list of shared memory messages (SHMMSG). Each message head holds at least two links: a self link that recursively points to itself, and a next link that points to the next message in the shared memory queue (SHMQ) 501.

For example, the SHMSGHEAD 521 for the message 503 can include a self link, self 521a, that points to its own SHMSGHEAD 521, and a next link, next 521b, that points to the SHMSGHEAD 531 for the message 504; the SHMSGHEAD 531 for the message 504 can include a self link, self 531a, and a next link, next 531b, that points to the SHMSGHEAD 541 for the message 505; the SHMSGHEAD 541 for the message 505 can include a self link, self 541a, and a next link, next 541b, that points to the SHMSGHEAD 542 for the message 506; and the SHMSGHEAD 542 for the last message 506 can include a self link, self 542a, and a next link, next 542b, that points to a empty slot, or is assigned with a value NIL.

Furthermore, the first message in the shared memory queue (SHMQ) 501 can be a dummy (or blank) message, and the tail link can point to the dummy message when the shared memory queue (SHMQ) 501 is empty. This dummy (or blank) head can make queuing logic simple, since adding a new message to the shared memory queue (SHMQ) 501 can be implemented by linking the new message to the next link in the message head of the last message, to which the tail link points, regardless of whether the shared memory queue (SHMQ) 501 is empty or not.

Each shared memory message (SHMMSG) 503-506 can be a pre-allocated buffer in the shared memory 500. Each process attached to the shared memory can have an individual shared memory address in its own address space. Thus, the pointers to the shared memory message (SHMMSG) 503-506 may not be used directly in an inter-process situation.

In order to access a shared memory message (SHMMSG), a process can hold an array of pointers to the various shared memory message lists. Each shared memory message (SHMMSG) can be addressed using a shared memory message (SHMMSG) list address and an index within the shared memory message (SHMMSG) list. Thus, an address for a shared memory message (SHMMSG) can include two leveled indices: one link to a shared memory message list and another link to the shared memory message (SHMMSG) within the list.

In the example of Tuxedo, during system initialization, a number of message lists can be created in a local shared memory (e.g. the local BB), with each message list specified with a particular buffer size and message count. Additionally, a number of SHMQ heads can be created in the local BB according to user configuration. Tuxedo applications can allocate message buffers by calling tpalloc( )/tprealloc( ) after being attached to the local BB. Additionally, the tpalloc( )/tprealloc( ) calls can return buffer allocated in the local memory, before BB is attached or when shared memory buffer resource is exhausted.

Figure 6:
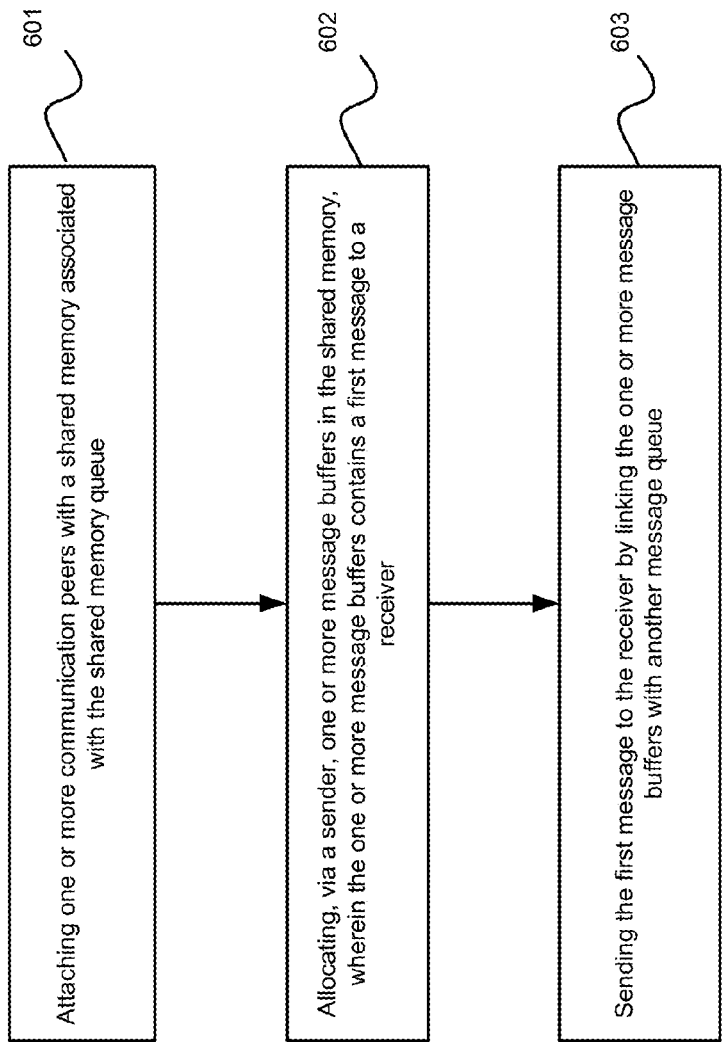
FIG. 6 illustrates an exemplary flow chart for supporting intra-node communication based on a shared memory queue (SHMQ) in a transactional middleware machine environment, in accordance with an embodiment of the invention.

FIG. 6 illustrates an exemplary flow chart for supporting intra-node communication based on shared memory queue (SHMQ) in a transactional middleware machine environment, in accordance with an embodiment of the invention. As shown in FIG. 6, at step 601, the system can attach one or more communication peers with a shared memory associated with the shared memory queue. Then, at step 602, a sender can allocate one or more message buffers in the shared memory, wherein the one or more message buffers contains a first message for a receiver. Furthermore, at step 603, the sender can send the first message to the receiver by linking the one or more message buffers with another message queue.

Buffer Allocation for Shared Memory Queue (SHMQ)

In accordance with an embodiment of the invention, a shared memory queue (SHMQ) can significantly improve intra-node messaging performance in a transactional middleware environment, e.g. the Tuxedo environment.

Figure 7:
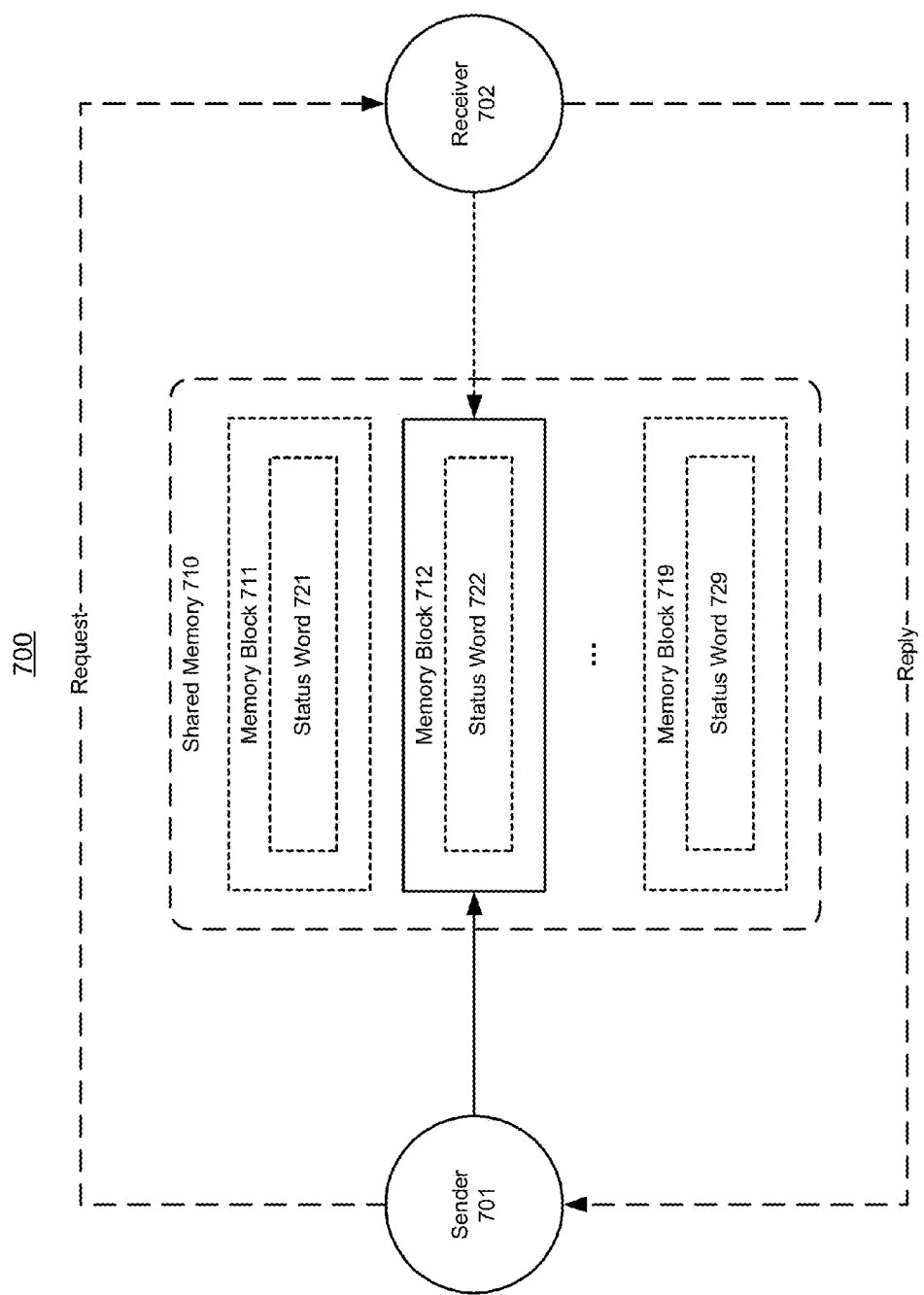
FIG. 7 shows an illustration of allocating one or more message buffers in a shared memory in a transactional middleware machine environment, in accordance with an embodiment of the invention.

FIG. 7 shows an illustration of allocating one or more message buffers in a shared memory in a transactional middleware machine environment, in accordance with an embodiment of the invention. As shown in FIG. 7, the communication peers, such as a sender 701 of a message and a receiver 702 of the message, can be attached to a shared memory 710 in a transactional middleware machine environment 700. The shared memory 710 can include one or more memory blocks, e.g. memory blocks 711-719, which can be used as message buffers by the system. Furthermore, each memory block 711-719 can hold a status word 721-729 indicating whether the associated memory block 711-719 is free or occupied by a process.

In the example as shown in FIG. 7, the sender 701 can allocate a memory block 712 in the shared memory 710, as a message buffer 712, for preparing a message to be sent to the receiver 702. During the process of transmitting the message, the message buffer 712 may need to be shared by other parties in the messaging process, e.g. an intermediate messaging process or the receiver 702 of the message.

The system can prevent the different parties from accessing the message buffer 712 at the same time, in order to prevent contention in the shared memory 710. For example, the ownership of the message block 712 in a message round trip process can be illustrated as in the below:

the sender 701 of a request message owns the message buffer 712 and has full access until the request message is sent, the receiver 702 owns the message buffer 712 and has full access, and the sender has no access to the message buffer 712, until the receiver frees the message buffer 712 or sends a reply message back, after the receiver 702 sends the reply message back or frees the message buffer 712, the sender 701 gains the ownership of the message buffer 712 again, and the receiver 701 has no access to the message buffer 712, and any party can free the message buffer 712 regardless of ownership, and after the message buffer 712 is freed, the ownership may be yielded, while whether the message buffer 712 is really freed can depend on other factors.

Thus, the buffer allocation by the communication peers 701-702 can be mutual exclusive, since the shared memory 710 resource is centralized. Unlike the buffers that are allocated in local memory of each process, the shared memory buffer allocation can be sensitive in concurrence environment and can be beneficial with the usage of a high performance allocation algorithm.

In the example of Tuxedo, the addresses of TCMs in the TMMSG head can be stored as pointers, which can be used only in the address space of one process. It is beneficial to make sure all involved parties accessing the shared memory message mutual-exclusively, in order to avoid segmentation fault that can be caused by accessing TMMSG improperly.

Figure 8:
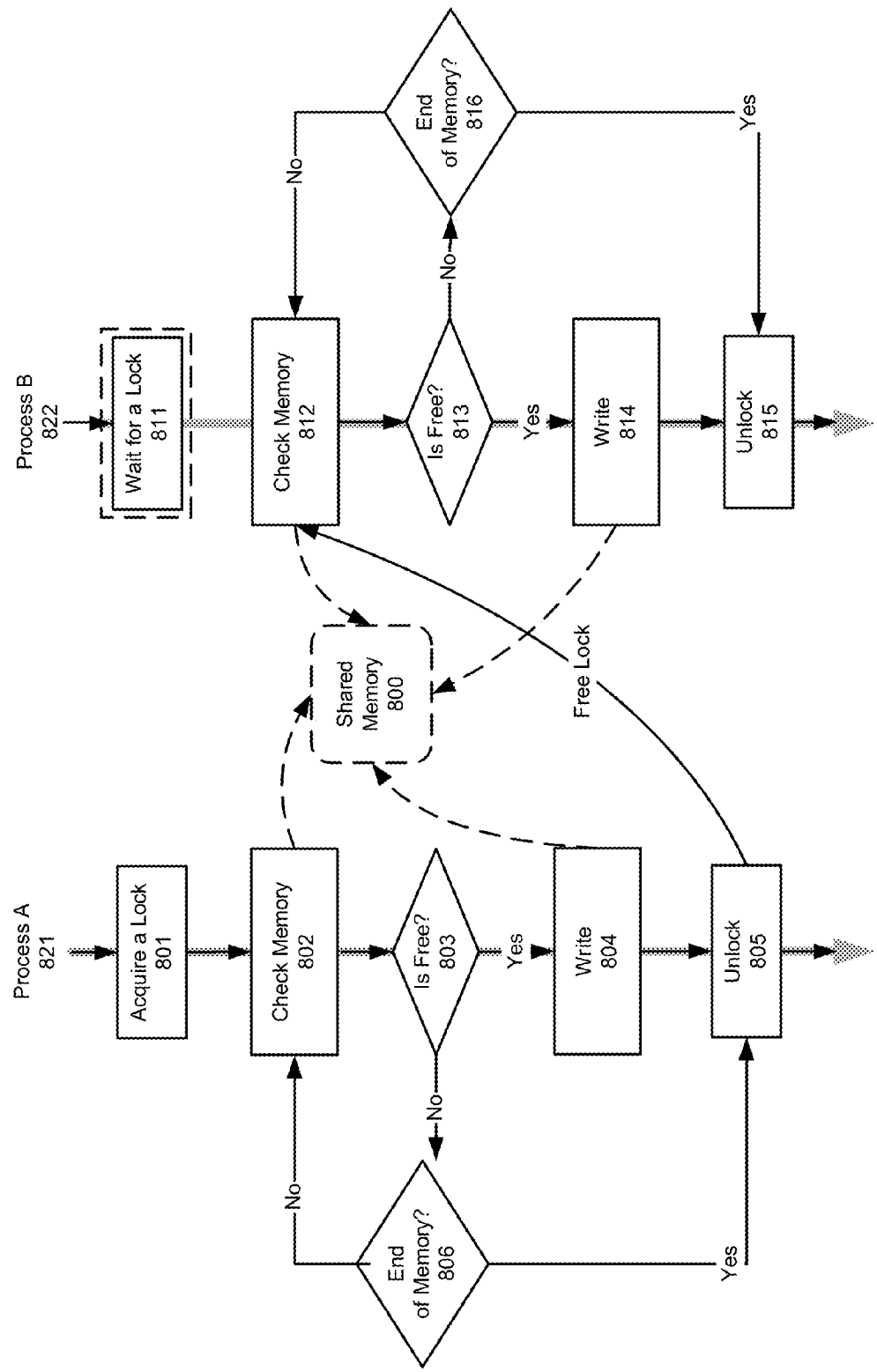
FIG. 8 shows an illustration of a one-step lock approach for allocating buffer in a shared memory for a shared memory queue (SHMQ) in a transactional middleware machine environment, in accordance with an embodiment of the invention.

FIG. 8 shows an illustration of a one-step lock approach for allocating buffer in a shared memory for shared memory queue (SHMQ) in a transactional middleware machine environment, in accordance with an embodiment of the invention. As shown in FIG. 8, multiple processes, e.g. process A 821 and process B 822, may be attempting to allocate a message buffer from a shared memory 800 (with a plurality of memory blocks), concurrently.

At step 801, the process A 821 can acquire a lock for accessing an array in the shared memory 800. At step 802-803, the process A 821 can check whether a memory block in the shared memory 800 that it current visits is free. At step 804, if the memory block is free, the process A 821 can proceed to occupy the memory block and write in the memory. Then, at step 805, the process A 821 can release the lock.

Alternatively, at step 806, if the memory block is not free, the process A 821 can check whether it has already reached the end of the memory. If more memory blocks are available, the process A 821 can proceed to check the next available memory block by repeating the step 802. Otherwise, the process A 821 can release the lock (step 805).

Concurrently, at step 811, another process, e.g. process B 822, may attempt to acquire the lock without success, since the process A is currently holding the lock. The system can block the process B 822 from accessing the array in the shared memory 800.

Then, at step 812, after the process A 821 releases the lock, the process B 822 can acquire the lock and proceed to check memory. Similarly, at steps 813-816, the process B 822 can travel through the array in the shared memory 800 to find a free memory block, and then set the status of the free memory block to be occupied before free the lock.

The one-step lock approach can avoid the contention between the multiple processes A-B 821-822 by designating a lock for each array in the shared memory 800. Using the one-step lock approach, the allocation requests remains serialized, which may lead to the situations that a process may need to wait until another process finishing allocation.

Figure 9:
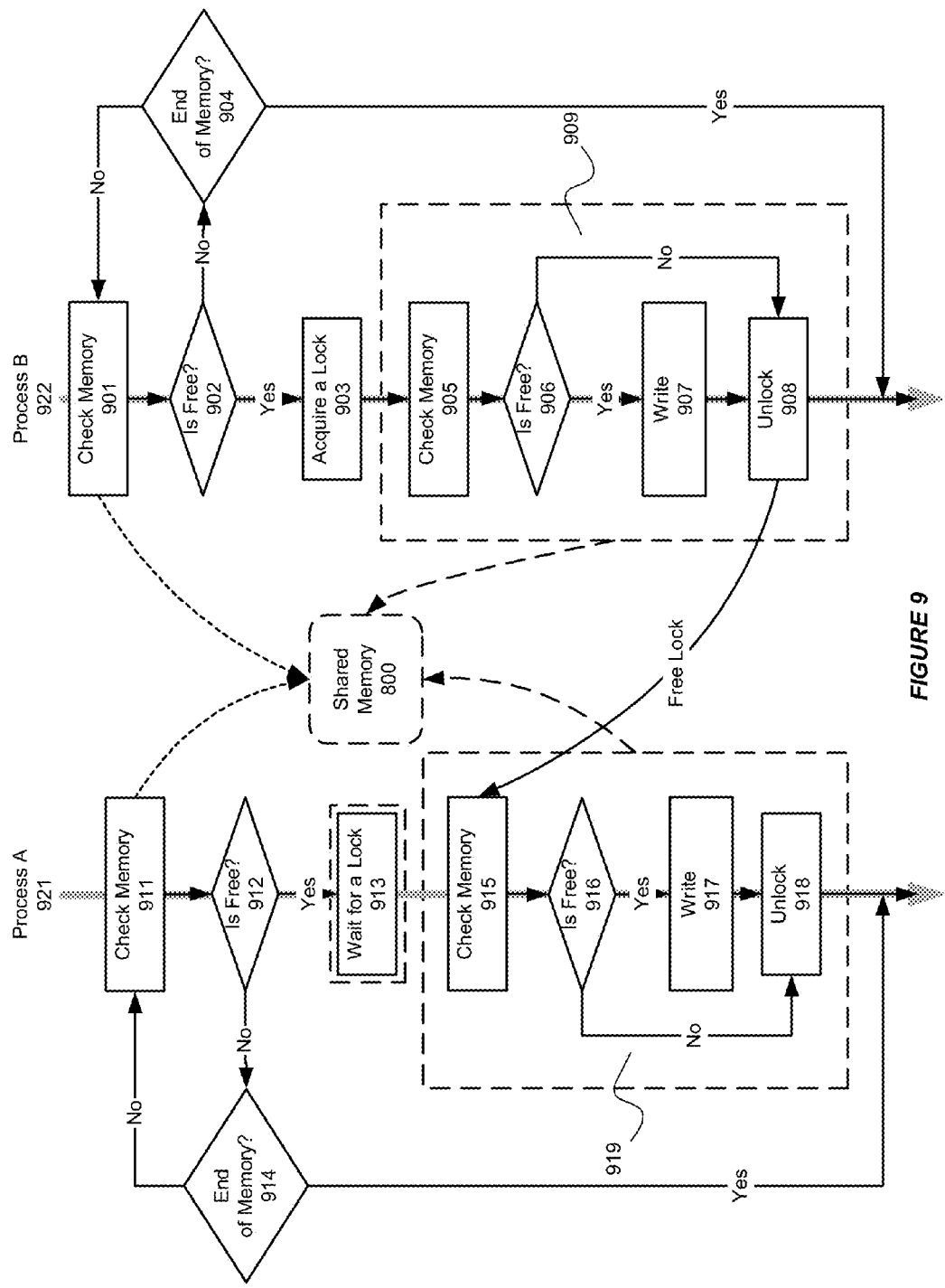
FIG. 9 shows an illustration of a two-step lock approach for allocating buffer in a shared memory for a shared memory queue (SHMQ) in a transactional middleware machine environment, in accordance with an embodiment of the invention.

FIG. 9 shows an illustration of a two-step lock approach for allocating buffer in a shared memory for shared memory queue (SHMQ) in a transactional middleware machine environment, in accordance with an embodiment of the invention. As shown in FIG. 9, multiple processes, e.g. process A 921 and process B 922, may be attempting to allocate message buffer from a shared memory 900 (with a plurality of memory blocks), concurrently.

At the steps 901-904 and 911-914, both the process A 921 and the process B 922 are allowed to travel through the shared memory 900 concurrently and check for a free slot in the shared memory 900. Each of the process A 921 and the process B 922 can attempt to acquire a lock when they find a free slot with contention. In the example as shown in FIG. 9, the process B 922 successfully acquired a lock while the process A 921 failed to acquire the lock and is blocked.

Then, at the steps 905-908, the process B 922 can proceed to check the memory again to ensure that the slot is actually free, before occupying the memory block and perform a write operation.

After the process B 922 releases the lock, at the steps 905-908, the process A 921 can acquire the lock and proceed to check the memory and occupy a memory slot if it is free.

Using the two-step lock approach, the system can avoid serializing the allocation requests and can improve concurrency. The two-step lock approach allows a process to first travel through an array in the shared memory 900 without holding a lock. The process may still need to acquire a lock when it finds a slot that seems to be free.

On the other hand, the lock requests (steps 909 and 919) may remain serialized, since a process can not complete buffer allocation without first holding a lock on an array in the shared memory 900. Thus, in a high concurrence environment, the two-step lock approach may cause the processes to race (or contend) for a lock. Furthermore, one process may acquire lock multiple times before it finds a real free memory block, due to the use of dirty read without lock in the system.

Figure 10:
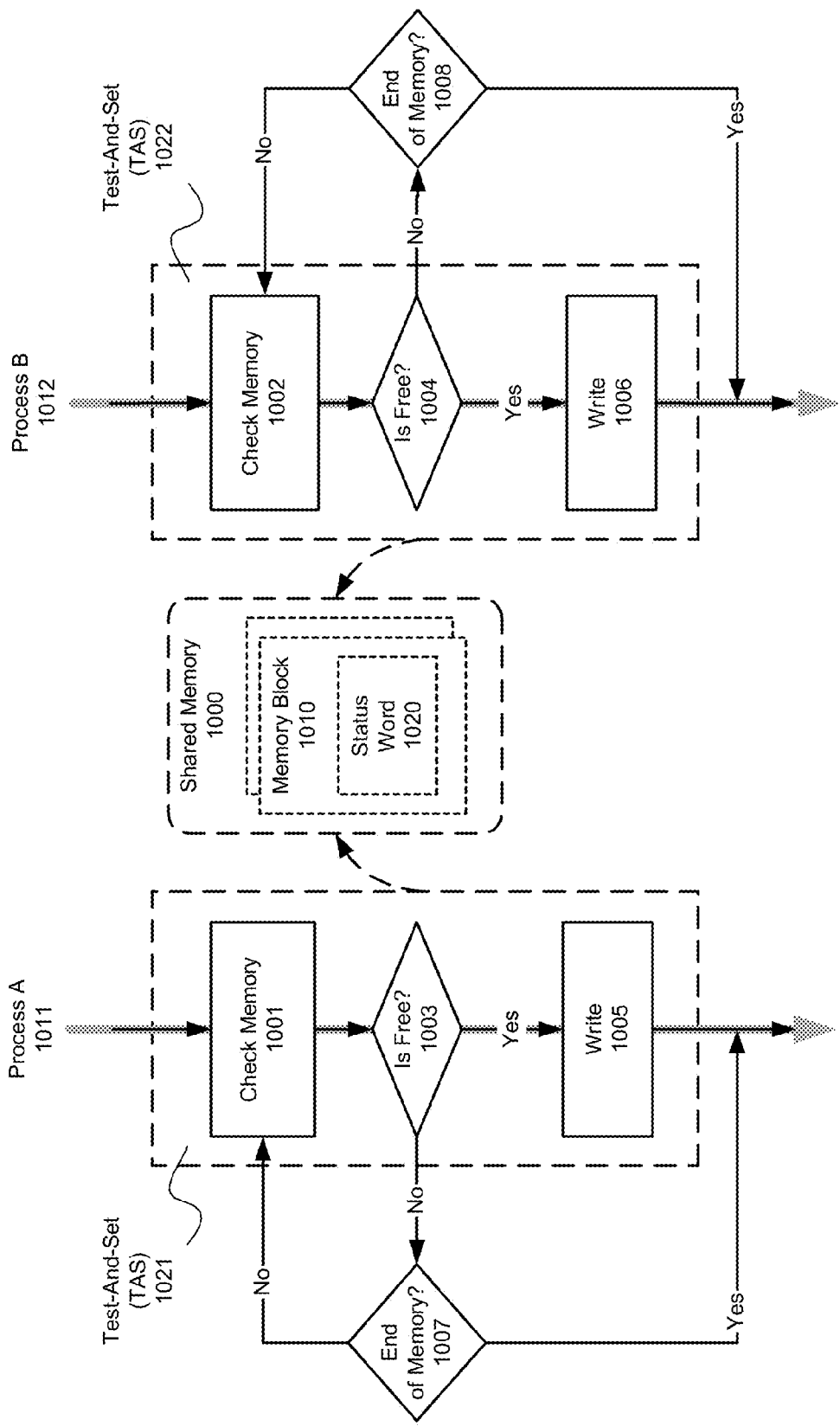
FIG. 10 shows an illustration of a lock free approach for allocating buffer in a shared memory for a shared memory queue (SHMQ) in a transactional middleware machine environment, in accordance with an embodiment of the invention.

FIG. 10 shows an illustration of a lock free approach for allocating buffer in a shared memory for shared memory queue (SHMQ) in a transactional middleware machine environment, in accordance with an embodiment of the invention. As shown in FIG. 10, multiple processes, e.g. a process A 1011 and a process B 1012, may be attempting to allocate buffer from a shared memory 1000, concurrently. The shared memory 1000 can be organized as arrays of memory blocks 1010 with fixed size, with each memory block 1010 holding a status word 1020 indicating whether it is free or occupied.

The system allows both the process A 1011 and the process B 1012 to perform an atomic operation 1021-1022 on the shared memory, concurrently. This atomic operation can be based on a TAS (Test-And-Set) operation, which is an OS provided atomic operation that costs approximately to a single instruction. The TAS operation can test whether a given word is true. When the word is not true, the TAS operation can set the word to be true and return success. Otherwise, the TAS operation can return fail without changing the word.

At the steps 1001 and 1003, the process A 1011 can first check the status word associated with a memory block in the shared memory 1000 and determines whether the memory block is free. For example, the memory block is free when the TAS operation 1021 succeeds. Then, at step 1005, the buffer can be allocated since the TAS operation 1021 allows the process A 1011 to occupy the memory block by changing the status word to true. Otherwise, the memory block is occupied by others. Furthermore, at step 1007, when more memory blocks are available in the shared memory 1000, the process A 1011 can travel further in the shared memory 1000.

Similarly, at the steps 1002 and 1004, the process B 1012 can check the status word associated with a memory block in the shared memory 1000 and determines whether the memory block is free. Then, at step 1006, a buffer can be allocated since the TAS operation 1022 allows the process B 1012 to occupy the memory block by changing the status word to true. Otherwise, at step 1008, when more memory blocks are available in the shared memory 1000, the process B 1012 can travel further in the shared memory 1000.

Using the lock free approach, the shared memory queue (SHMQ) requires no overhead for mutual-exclusive access, with all requests are fully concurrent at the OS instruction level. The allocation performance can be comparable to local memory allocation even in a high concurrence environment.

The shared memory queue (SHMQ) can avoid using a mutual-exclusive lock to complete allocation, which may impact the performance of the system in a high concurrence environment. Thus, the lock-free algorithm can prevent the distribute lock contention problem and allows the shared memory queue (SHMQ) to gain performance in high concurrence environment.

Figure 11:
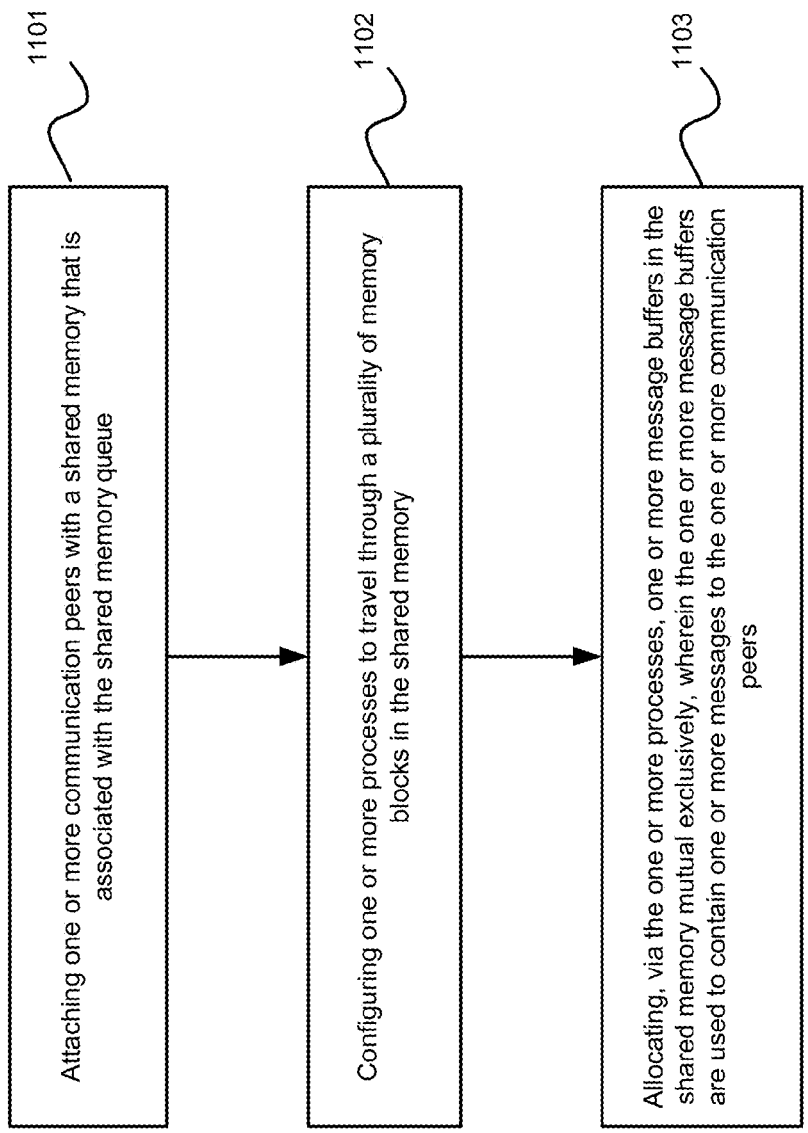
FIG. 11 illustrates an exemplary flow chart for supporting buffer allocation in a shared memory queue, in accordance with an embodiment of the invention.

FIG. 11 illustrates an exemplary flow chart for supporting buffer allocation in a shared memory queue, in accordance with an embodiment of the invention. As shown in FIG. 11, at step 1101, the system can attach one or more communication peers with a shared memory that is associated with the shared memory queue. Then, at step 1102, the system can configure one or more processes to travel through a plurality of memory blocks in the shared memory. Furthermore, at step 1103, the one or more processes can allocate one or more message buffers in the shared memory mutual exclusively, wherein the one or more message buffers are used to contain one or more messages to the one or more communication peers.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting lock free buffer allocation in a shared memory providing zero-copy message transfer between processes, the system comprising:
   one or more microprocessors;
   a plurality of processes running on the one or more microprocessors, the plurality of processes comprising an application client process and an application server process; and
   a shared memory comprising a plurality of memory blocks and being operatively attached with the plurality of processes for sharing access to the shared memory by the plurality of processes, wherein each of the plurality of memory blocks stores a status word representative of an occupancy condition of the respective memory block;
   wherein each of the application client and server processes operates concurrently with one or more other processes of the plurality of processes to:
      using a lock free atomic operation:
         find a free memory block of the plurality of memory blocks of the shared memory unoccupied by the one or more other processes of the plurality of processes by travelling through the shared memory and inspecting the status words of the memory blocks to locate, as the free memory block, a memory block having a status word representative of an unoccupied condition; and
         allocate one or more shared memory message buffers in the shared memory for mutual-exclusive access relative to the one or more other processes of the plurality of processes by occupying the found free memory block and modifying the status word of the found free memory block to represent an occupied condition,
   wherein the plurality of memory blocks are used to contain one or more shared memory messages for the plurality of processes to zero-copy communicate the one or more shared memory messages between the plurality of processes,
   wherein the application client process zero-copy communicates a shared memory message received in an allocated shared memory message buffer with the application server process without copying the shared memory message outside of the shared memory by:
      linking, by the application client process, the allocated shared memory message buffer storing the message with a request (RQ) shared memory queue (SHMQ) of the shared memory attached with the application server process; and
      receiving the message by the application server process by delinkinq, by the application server process, the allocated shared memory message buffer from the RQ SHMQ.

2. The system according to claim 1, wherein:
   the allocated shared memory message buffer is configured to include a head structure and a linked list of messages.

3. The system according to claim 1, wherein:
   each of said one or more shared memory message buffers is pre-allocated with a fixed size, wherein at least one shared memory message buffer of said one or more shared memory message buffers can be shared by the plurality of processes.

4. The system according to claim 1, wherein:
   said plurality of processes operate to visit a second memory block in the shared memory, after detecting that the first memory block is occupied by another process.

5. The system according to claim 1, wherein:
   the atomic operation is a single instruction test-and-set (TAS) operation.

6. The system according to claim 5, wherein:
   the TAS operation checks a status word which indicates whether a memory block is free or occupied.

7. A method for supporting lock free buffer allocation in a shared memory providing zero-copy message transfer between processes, the method comprising:
   attaching a plurality of processes comprising an application client process and an application serer process with a shared memory that comprises a plurality of memory blocks and is operatively attached with the plurality of processes for sharing access to the shared memory by the plurality of processes, wherein each of the plurality of memory blocks of the shared memory stores a status word representative of an occupancy condition of the respective memory block;
   configuring each of the application client and server processes operated concurrently with one or more other processes of the plurality of processes to:
      using a lock free atomic operation:
         find a free memory block of the plurality of memory blocks of the shared memory unoccupied by the one or more other processes of the plurality of processes by travelling through the shared memory and inspecting the status words of the memory blocks to locate, as the free memory block, a memory block having a status word representative of an unoccupied condition; and
         allocating, via the plurality of processes, one or more shared memory message buffers in the shared memory for mutual-exclusive access relative to the one or more other processes of the plurality of processes by occupying the found free memory block and modifying the status word of the found free memory block to represent an occupied condition,
   wherein the plurality of memory blocks are used to contain one or more shared memory messages for the plurality of processes to zero-copy communicate the one or more shared memory messages between the plurality of processes,
   wherein the application client process zero-copy communicates a shared memory message received in an allocated shared memory message buffer with the application server process without copying the shared memory message outside of the shared memory by:

linking, by the application client process, the allocated shared memory message buffer storing the message with a request (RQ) shared memory queue (SHMQ) of the shared memory attached with the application server process; and receiving the message by the application server process by delinkinq, by the application server process, the allocated shared memory message buffer from the RQ SHMQ.

8. The method according to claim 7, further comprising:
configuring the allocated shared memory message buffer to include a head structure and a linked list of messages.

9. The method according to claim 7, further comprising:
pre-allocating each of said one or more shared memory message buffers is with a fixed size, wherein at least one shared memory message buffer of said one or more shared memory message buffers can be shared by the plurality of processes.

10. The method according to claim 7, further comprising:
proceeding to visit a second memory block in the shared memory, after detecting that the first memory block is occupied by another process.

11. The method according to claim 7, further comprising:
allowing the atomic operation to be a single instruction test-and-set (TAS) operation.

12. A non-transitory machine readable storage medium having instructions stored thereon that when executed cause a system to perform steps comprising:

attaching a plurality of processes comprising an application client process and an application serer process with a shared memory that comprises a plurality of memory blocks and is operatively attached with the plurality of processes for sharing access to the shared memory by the plurality of processes, wherein each of the plurality of memory blocks of the shared memory stores a status word representative of an occupancy condition of the respective memory block;

configuring each of the application client and server processes operated concurrently with one or more other processes of the plurality of processes to:
using a lock free atomic operation:
find a free memory block of the plurality of memory blocks of the shared memory unoccupied by the one or more other processes of the plurality of processes by travelling through the shared memory and inspecting the status words of the memory blocks to locate, as the free memory block, a memory block having a status word representative of an unoccupied condition; and
allocating, via the plurality of processes, one or more shared memory message buffers in the shared memory for mutual-exclusive access relative to the one or more other processes of the plurality of processes by occupying the found free memory block and modifying the status word of the found free memory block to represent an occupied condition,
wherein the plurality of memory blocks are used to contain one or more shared memory messages for the plurality of processes to zero-copy communicate the one or more shared memory messages between the plurality of processes,
wherein the application client process zero-copy communicates a shared memory message received in an allocated shared memory message buffer with the application server process without copying the shared memory message outside of the shared memory by:
linking, by the application client process, the allocated shared memory message buffer storing the message with a request (RQ) shared memory queue (SHMQ) of the shared memory attached with the application server process; and
receiving the message by the application server process by delinking, by the application server process, the allocated shared memory message buffer from the RQ SHMQ.

* * * * *

UNITED STATES PATENT AND TRADEMARK OFFICE
CERTIFICATE OF CORRECTION

PATENT NO.         : 9,658,879 B2
APPLICATION NO.    : 13/804414
DATED              : May 23, 2017
INVENTOR(S)        : Lv et al.

Page 1 of 1

It is certified that error appears in the above-identified patent and that said Letters Patent is hereby corrected as shown below:

In the Drawings

On sheet 1 of 11, in FIGURE 1, under Reference Numeral 101, Line 1, delete "Appliation" and insert -- Application --, therefor.

On sheet 1 of 11, in FIGURE 1, under Reference Numeral 102, Line 1, delete "Appliation" and insert -- Application --, therefor.

On sheet 2 of 11, in FIGURE 2, under Reference Numeral 201, Line 1, delete "Appliation" and insert -- Application --, therefor.

On sheet 2 of 11, in FIGURE 2, under Reference Numeral 202, Line 1, delete "Appliation" and insert -- Application --, therefor.

In the Specification

In Column 11, Line 2, after "data" insert -- . --.

In the Claims

In Column 12, Line 2, in Claim 1, delete "delinkinq," and insert -- delinking, --, therefor.

In Column 12, Line 30, in Claim 7, delete "serer" and insert -- server --, therefor.

In Column 13, Line 7, in Claim 7, delete "delinkinq," and insert -- delinking, --, therefor.

In Column 13, Line 32, in Claim 12, delete "serer" and insert -- server --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*